H. H. CARNEY.
DRUM TIGHTENER.
APPLICATION FILED APR. 13, 1909.
967,726.
Patented Aug. 16, 1910.
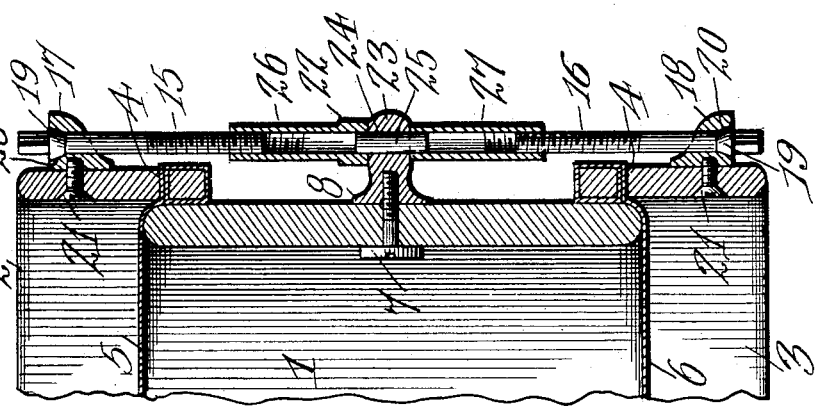
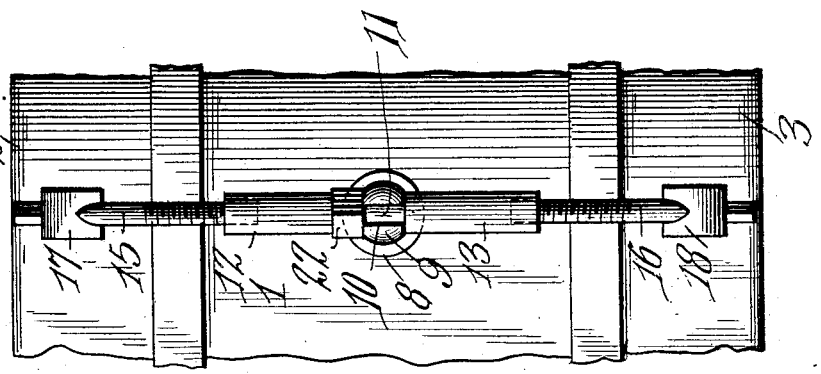
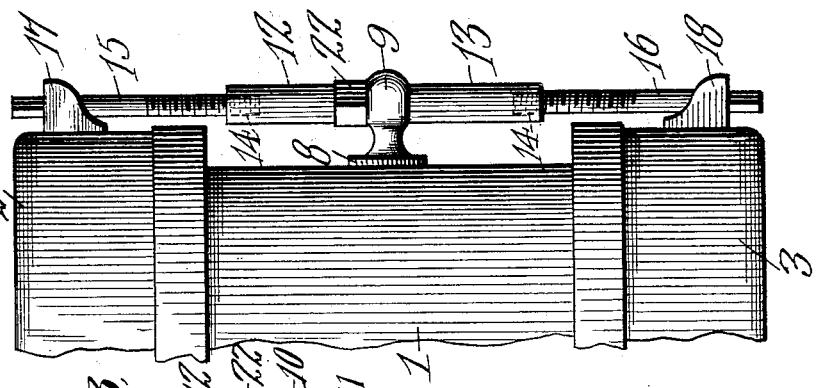
Harry H. Carney, Inventor
Witnesses
By E. E. Vrooman,
his Attorney.

UNITED STATES PATENT OFFICE.

HARRY H. CARNEY, OF PORTLAND, OREGON.

DRUM-TIGHTENER.

967,726.  Specification of Letters Patent.  Patented Aug. 16, 1910.

Application filed April 13, 1909. Serial No. 489,648.

*To all whom it may concern:*

Be it known that I, HARRY H. CARNEY, a citizen of the United States, residing at Portland, in the county of Multnomah and State of Oregon, have invented certain new and useful Improvements in Drum-Tighteners, of which the following is a specification, reference being had therein to the accompanying drawing.

This invention relates to drums, and has specially in view a head tightener therefor whereby both heads may be tightened simultaneously or they may be independently tightened.

In carrying out the object of the invention generally stated above, it will, of course, be understood that the essential features thereof are susceptible of changes in details and structural arrangements, but certain preferred and practical embodiments thereof are shown in the accompanying drawings wherein—

Figure 1 is a detail view of a portion of a drum, showing the head tightener in side elevation. Fig. 2 is a similar view showing the head tightener in front elevation. Fig. 3 is a detail longitudinal sectional view of a portion of one of the tighteners. Fig. 4 is a detail longitudinal sectional view of a portion of a drum and one of the tighteners, showing a modified manner of supporting the same.

Referring to the accompanying drawings by numerals, 1 designates the body of a drum and 2—3 designate the head collars therefor, and 4 designates the usual hoops over which the edge of the heads 5 and 6 are looped, as is shown in Fig. 4. The body 1 has a screw bolt 7 projecting through its intermediate portion the threaded end of which engages with the annular flanged end 8 of a bearing block 9 the outer portion of which is bifurcated as indicated at 10 for the reception of connector rod 11 which is integral with two tubular extensions 12 and 13 one of which projects above and the other below the said bearing block. Each extension 12 and 13 has its outer end threaded internally as indicated at 14 for the reception of a threaded end of screw bolts 15 and 16, said screw bolts 15—16 passing through blocks 17 and 18, one of which is carried by each collar of the drum, said bolts being provided with an annular beveled flange 19 which is seated within a similarly shaped recess 20 formed in the blocks 17 and 18. The ends of said rods or bolts 15—16 project beyond the blocks 17 and 18 and have their sides squared so that they may be readily manipulated to adjust the collars 2 and 3 independently. The blocks 17 and 18 are held in detachable engagement with the collars by means of the screw bolts 21. One of the tubular extensions 12 and 13 has its exterior surface in the form of a hexagonal nut 22 whereby the same may be rotated by means of a wrench so that both of the screw rods 15 and 16 may be adjusted by said extensions to simultaneously regulate the tension of the collars upon the heads of the drum.

In Fig. 4 of the accompanying drawings the bearing block 23 carried by the drum body is provided with a transverse opening 24 in which a rod 25 is mounted, said rod having its ends rigidly connected with the oppositely extending tubes 26 and 27 which have a threaded connection with the screw bolts for adjusting the collars of the drum. One of said tubes 26 and 27 is provided with a nut formation similar to that described in connection with the preferred form of the invention and for the same purpose.

It will be seen from the foregoing that in all the forms of the invention, the heads may be simultaneously adjusted by rotating the tubular extension provided with the nut formation, and that either head may be adjusted by turning its screw bolt.

What I claim as my invention is:—

1. A tightening device for drum-heads comprising a pair of oppositely projecting tubular members the outer ends of which are threaded, a connecting rod for holding the inner ends of said members in rigid relation with respect to each other, one of said members being provided with a nut shaped enlargement whereby the same may be rotated, and a rod connecting the heads to the threaded end of each member and having a squared end whereby the same may be rotated to independently adjust the tension of the drum heads.

2. In a device of the character described, the combination with the drum body, of a pair of oppositely projecting tubular members the outer ends of which are threaded, a connecting rod for holding said members in rigid relation, a bearing block carried by said body and in which the connecting rod is rotatably mounted, and a rod projecting from the threaded end of each member and adapted to be adjusted by the rotation of said members, said rods being provided with squared heads whereby they may be independently adjusted.

3. In a device of the character described the combination with a drum body, of a pair of oppositely projecting tubular members, a connecting rod therefor, a bearing block carried by said body and in which said rod is rotatably mounted, the outer end of each member being threaded, holding blocks carried by said body, a rod passing through each block and having its inner end in detachable engagement with one of the threaded ends of the members, said rods being provided with squared ends and one of the members being provided with a nut-shaped portion whereby said rods may be independently adjusted by manipulating their squared ends, and may be also simultaneously adjusted by turning the member provided with the nut-shaped portion.

4. In a device of the character described, the combination with a drum body having adjustable head collars, bearing blocks projecting from the drum body, oppositely-extending pairs of tubular extensions, rods rotatably mounted in said blocks rigidly connecting the inner ends of said tubular extensions, one of each of said tubular extensions being provided with a nut-shaped formation, said tubular extensions having their outer ends threaded, and adjusting rods connected at one end to said threaded ends of the tubular extensions and having the other end mounted in supports on the drum collars.

5. In a device of the character described the combination with the drum body provided with adjustable head collars, a bearing block carried by said body and having an end bearing, a connecting rod rotatably mounted in said bearing and provided with oppositely projecting members, holding blocks carried by the said collars and each provided with a recessed opening, and rods passing through each of the holding blocks and having their inner ends in detachable and adjustable engagement with said tubular members.

6. In a device of the character described the combination with the drum body provided with adjustable head collars, a holding block carried by each collar having an opening therethrough the outer end of which is enlarged, an adjusting rod projecting through each block and provided with a tapering annular flange fitting the enlarged outer end of the opening of the block, the outer ends of said rods being squared and their inner ends being threaded, and oppositely projecting rigidly connected members rotatably supported by the drum body and having threaded outer ends for engagement with the threaded ends of the adjusting rods, one of said members being provided with a nut shaped portion to facilitate rotation of the same to adjust the adjusting rods.

In testimony whereof I hereunto affix my signature in presence of two witnesses.

HARRY H. CARNEY.

Witnesses:
GEO. A. CARNEY, Sr.,
ROBERT J. UPTON.